(12) United States Patent
Ferrarese et al.

(10) Patent No.: US 9,574,663 B2
(45) Date of Patent: Feb. 21, 2017

(54) SINGLE-PIECE OIL CONTROL RING

(71) Applicants: Mahle Metal Leve S/A, Jundiaií-Sp (BR); Mahle International GmbH, Stuttgart (DE)

(72) Inventors: André Ferrarese, São Paulo (BR); Rafael A. Bruno, São Paulo (BR); Rudolf Huegel, Stuttgart (DE)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 0 days.

(21) Appl. No.: 14/439,521

(22) PCT Filed: Oct. 31, 2013

(86) PCT No.: PCT/BR2013/000449
§ 371 (c)(1),
(2) Date: Apr. 29, 2015

(87) PCT Pub. No.: WO2014/066965
PCT Pub. Date: May 8, 2014

(65) Prior Publication Data
US 2015/0292621 A1    Oct. 15, 2015

(30) Foreign Application Priority Data
Oct. 31, 2012    (BR) .............................. 102012028094

(51) Int. Cl.
*F16J 9/20* (2006.01)
*F16J 9/26* (2006.01)

(52) U.S. Cl.
CPC    *F16J 9/206* (2013.01); *F16J 9/26* (2013.01)

(58) Field of Classification Search
CPC ........ F04B 53/143; F16J 15/3236; F16J 9/20; F16J 9/206
See application file for complete search history.

(56) References Cited

U.S. PATENT DOCUMENTS

| | | | | |
|---|---|---|---|---|
| 2,224,338 A | * | 12/1940 | Bowers ................. | B23P 15/065 277/463 |
| 2,715,556 A | * | 8/1955 | Prasse ..................... | F16J 9/203 277/461 |
| 2,764,458 A | * | 9/1956 | Ward ....................... | F16J 9/203 277/463 |
| 2,932,543 A | * | 4/1960 | Marien ..................... | F16J 9/20 277/463 |
| 3,050,354 A | | 8/1962 | Marien | |
| 3,206,219 A | * | 9/1965 | Hamm ..................... | F16J 9/203 277/463 |

(Continued)

*Primary Examiner* — Kristina Fulton
*Assistant Examiner* — Eugene G Byrd
(74) *Attorney, Agent, or Firm* — Fishman Stewart PLLC

(57) ABSTRACT

A single-piece oil control ring for a piston may include a body having at least one upper portion and at least one lower portion each facing towards a cylinder wall of an internal combustion engine. At least one of the upper portion and the lower portion may respectively define a first surface extending substantially perpendicular to the body and a receding second surface extending from the first surface substantially at an incline. The first surface may protrude towards the cylinder wall in relation to the second surface. The first surface may have a first area of contact with the cylinder wall, and at least 95% of the first area may contact the cylinder wall.

20 Claims, 3 Drawing Sheets

(56) References Cited

U.S. PATENT DOCUMENTS

| | | | | |
|---|---|---|---|---|
| 3,683,477 A | * | 8/1972 | Sugahara | B23P 15/08 |
| | | | | 148/518 |
| 3,752,490 A | * | 8/1973 | Geffroy | F16J 9/203 |
| | | | | 277/463 |
| 3,861,691 A | * | 1/1975 | Wheeler | F16J 15/3236 |
| | | | | 277/553 |
| 4,139,205 A | * | 2/1979 | Duck | F16J 9/066 |
| | | | | 267/1.5 |
| 4,687,212 A | * | 8/1987 | Timpson, Jr. | F16J 15/3236 |
| | | | | 277/556 |
| 5,064,206 A | * | 11/1991 | Bruni | F16J 9/206 |
| | | | | 277/463 |
| 5,472,216 A | * | 12/1995 | Albertson | F16J 15/3236 |
| | | | | 277/530 |
| 5,507,505 A | * | 4/1996 | von-Arndt | F16J 15/3236 |
| | | | | 277/436 |
| 5,590,887 A | * | 1/1997 | Senda | F16J 15/064 |
| | | | | 277/436 |
| 6,065,438 A | * | 5/2000 | Kiesel | F16J 9/20 |
| | | | | 123/193.6 |
| 6,655,697 B2 | * | 12/2003 | Heraud | F16J 9/206 |
| | | | | 277/472 |

* cited by examiner

SINGLE-PIECE OIL CONTROL RING

CROSS-REFERENCE TO RELATED APPLICATIONS

This application claims priority to Brazilian Patent Application No. 10 2012 028094-9, filed Oct. 31, 2012, and International Patent Application No. PCT/BR2013/000449, filed Oct. 31, 2013, both of which are hereby incorporated by reference in their entirety.

TECHNICAL FIELD

The present invention relates to a single-piece oil control ring that exhibit low tangential force values, even at during the beginning of engine operation, while keeping the consumption of oil reduced. Due to the low values of tangential force, the present ring provides a considerable reduction in the consumption of fuel, making the application thereof advantageous on new engines and also as an aftermarket component.

BACKGROUND

Internal combustion engines are energy transforming mechanisms used by most automotive vehicles, and comprise basically two main parts: one or more engine heads and an engine block. At the bottom of the head (s) are located the combustion chambers (on Diesel engines, the combustion chambers are generally in the piston heads) and on the engine block are located the cylinders and the crankshaft assembly. The crankshaft assembly is composed by pistons, rods and crankshaft.

An engine converts the energy produced by combustion of the (fuel and air) mixture in the combustion chambers into mechanical energy capable of imparting movement to the wheels.

Since the driving power required for moving the automobile comes from the burning of the air/fuel mixture in the combustion chamber, and in order to ensure a homogeneous combustion, without burning oil, and still to prevent excessive passage of gases from the cylinder to the crank-case, it is necessary to use rings for promoting good sealing of the clearance existing between the piston and the cylinder wall.

Most of modern internal combustion engines that work according to the Otto and Diesel cycles use three rings, two of which being compression rings and one being an oil control (scraper) ring. The compression rings have the function of preventing passage of combustion gases into the crank-case, and the oil ring has the function of scraping excess oil from the cylinder wall and returning it to the crankcase, controlling the thickness of the oil film, so that the operation of the engine will take place within the premises of design and operation.

Another important function of the rings is that of serving as a bridge for transmitting heat from the piston to the cylinder wall/liner, where dissipation of the calorie takes place through the cooling system.

The oil scraping rings may be composed of one, two or three parts.

Two-piece or three-piece oil scraping rings are employed in the vast majority of applications, by virtue of their good global performance.

A two-piece ring comprises an annular body provided with two trapezoidal annular protrusions that face the cylinder sleeve and an equally annular, internal and concentric expanding element.

A three-piece ring, in turn, usually has a first upper annular segment and a second lower annular segment, which are associated to an intermediate expanding element, which presses in a controlled manner the upper and lower segments against the cylinder wall. The force exerted by the expanding element, which is nothing else than a resilient element, is calculated so that the oil film on the cylinder wall will have the desired thickness.

A single-piece ring, in turn, has a more restricted application due to the fact of having much flexibility inherent in its design, which, on the one hand, imparts excellent conformability to the ring when in operation, adjusting easily, and on the other hand makes its surface finish more difficult, which requires the ring to apply a great tangential force against the cylinder wall in order to guarantee that it will end up conforming to the cylinder sleeve during the engine run-in.

This high tangential force causes a high consumption of fuel by the engine, and still higher during the run-in operation, which renders the single-piece-ring solution widely left aside with respect to the two-piece or three-piece equivalents.

Until now, nobody had developed a single-piece oil-scraping ring capable of conforming easily to the cylinder by virtue of its flexibility and, concomitantly, applying a low tangential force, even during engine run-in, guaranteeing the correct oil-film thickness and decreasing the consumption of fuel by the engine, as well as emission of $CO_2$.

SUMMARY

The present invention has the objective of providing a single-piece oil-scraping ring that has antagonistic properties of conforming easily to the cylinder by virtue of its flexibility and, concomitantly, applying a low tangential force, even during engine run-in, thus guaranteeing the correct oil-film thickness and reducing, in a non-negligible manner, the consumption of fuel by the engine, as well as the emission of $CO_2$.

The objectives of the present invention are achieved by means of a single-piece oil-control ring to be mounted in the piston groove, comprising a body defining at least one upper portion and one lower portion, both of them facing the cylinder wall of an internal combustion engine, each defining a first surface that is substantially perpendicular to the body, from which a second substantially inclined surface protrudes, the first surface defining a first area of contact with the cylinder wall, wherein at least 85% of the first area contacts the cylinder wall at the initial mounting of the engine.

Also, the objectives of the present invention are achieved by means of a single-piece oil control ring to be mounted in the piston groove, comprising at least one upper portion and one lower portion facing the cylinder wall of an internal combustion engine, each defining a first surface that is substantially perpendicular to the body, from which a second substantially surface protrudes, the second surface defining an angle ($\alpha$) taken from the prolongation of the first surface, wherein at least one of the upper or lower portions exhibits a first surface whose height is lower than 0.15 millimeters, and the angle ($\alpha$) is an acute angle equal to or greater than 30 decrees.

BRIEF DESCRIPTION OF THE DRAWINGS

The present invention will now be described in greater detail with reference to an example of embodiment represented in the drawings. The figures show.

DETAILED DESCRIPTION

Figure 1:
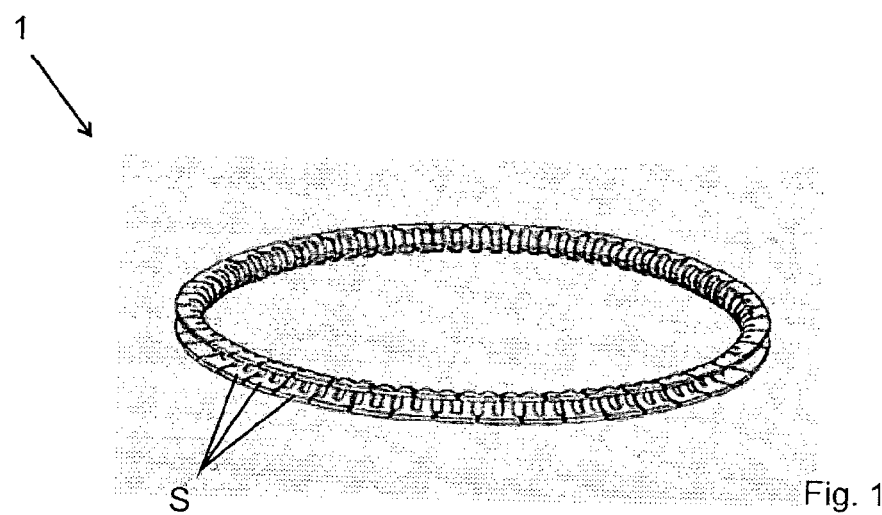
FIG. 1 is a perspective view of the single-piece oil scraping ring of the present invention.

According to a preferred embodiment and as shown in FIG. 1, the single-piece oil scraping ring of the present invention comprises a body provided with a plurality of operatively associated segments S, each having a degree of freedom of movement with respect to each other, which imparts to the ring 1 great flexibility and, as a result, great capability of adapting/conforming to the cylinder shape, thus guarantee maintenance of an adequate oil film in the most varied situations of operation of the engine.

It should be noted initially that the operation of the engine generates much heat, resulting chiefly from the explosion of the air-fuel mixture in the cylinder portion close to the cylinder head. In that region, the temperature is much higher than that presented by the cylinder as it moves away therefrom. This characteristic of different temperatures in the cylinder wall entails a number of deformations caused by different thermal expansion values, a situation in which the great conformation capability of the single-piece oil scraping is advantageous.

On the other hand, the great innovation and competitive advantage of the present ring 1 lies in the fact that it does not have the disadvantages of similar rings in use at present, which are the difficulty of carrying out surface-finish operations and the high tangential force during the engine run-in period, which entails an increase in the consumption of fuel.

The body, which is formed by the plurality of segments S, defines at least one upper portion 2 and one lower portion 2' facing the cylinder wall C of an internal combustion engine when the ring 1 is mounted on the piston groove. The upper and lower portions 2, 2' correspond to the free ends of the "C", which correspond to the shape of their cross-section.

Figure 2:
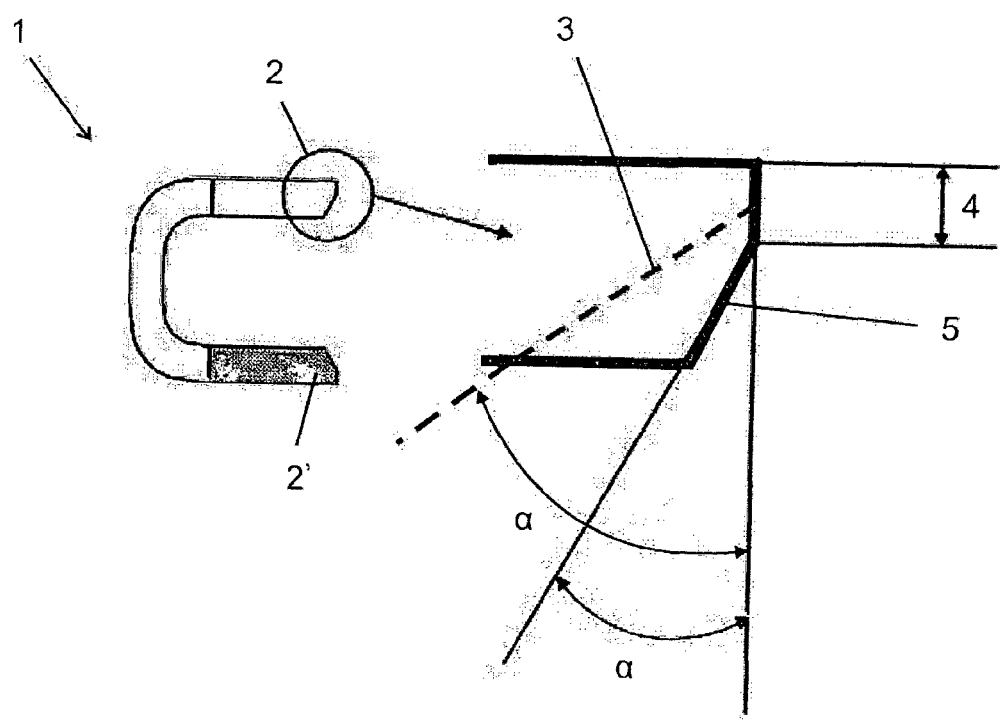
FIG. 2 is a first schematic cross-sectional view with enlargement of the outer circumferential upper border of the single-piece oil scraping ring of the present invention.
Figure 3:
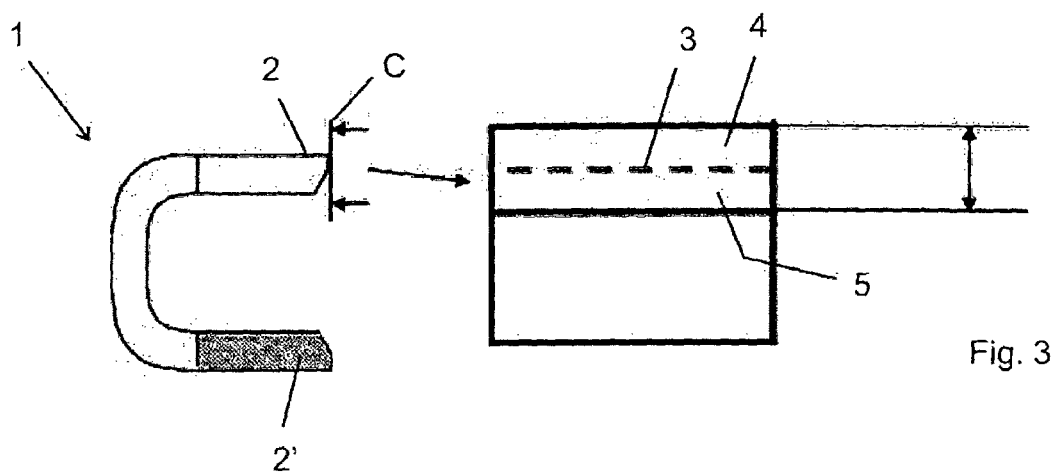
FIG. 3 is a second schematic cross-sectional view with enlargement of the outer circumferential upper border of the single-piece oil scraping ring of the present invention.
Figure 4:
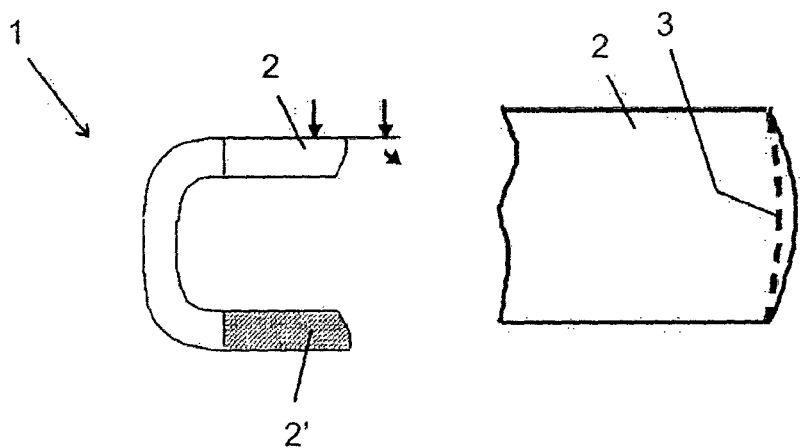
FIG. 4 is a third schematic cross-sectional view with enlargement of the outer circumferential upper border of the single-piece oil scraping ring of the present invention.

Evidently, the specific geometry of the ring 1 may vary slightly according to the engine type for which it has been developed, as long as a few project premises are observed, which will be commented on hereinafter. Thus, whatever the specific geometry of the upper and lower portions 2, 2', each of them defines a first surface 4 that is substantially perpendicular to the body (see especially FIG. 2), from which a second substantially inclined surface 5 protrudes, so that the second surface 5 defines an angle α taken from the prolongation of the first surface 4.

As a result of this constructive geometry of the upper and lower portions 2, 2', the first surface 4 defines a first area of contact A 1 with the cylinder wall that is smaller than the area defined, if the surface 5 were at a zero angle with it.

The great innovation of the ring of the present invention is to have a geometric arrangement and a manufacture process that guarantee that at least 95% of the first area A 1 will contact the cylinder wall in the initial mounting of the engine. In other words, even in the initial moments of the engine run-in period, it is guaranteed that at least 95% of the first area A 1 contacts the cylinder wall and, as a result, one guarantees correct control of the oil film already during the run-in.

Therefore, it becomes necessary to design the ring so that it will apply a high tangential force to the piston wall, which until now used to be made because one could not achieve a high percent of contact between A 1 and the cylinder wall on the present-day rings.

The lower tangential force applied by the ring 1 of the present invention results, as already discussed, in reduction of friction and the consequent lower consumption of fuel and emission of $CO_2$, which is very important if one considers that, on an average, not less than 10% (including changes of gases and auxiliaries) of the internal friction of an engine is generated by the rings and 50% to 70% of these 30% come from the oil scraping ring.

Therefore, the first surface 4 of at least one of the upper or lower portion 2, 2' has a height of 0.15 millimeters and the angle α formed by the second surface 5 taken from the prolongation of the first surface 4 is an acute angle α equal to or greater than 30 degrees. Both values are quite different from those exhibited by the single-piece oil scraping rings known at present and guarantee greater efficiency of the present invention.

Figure 5:
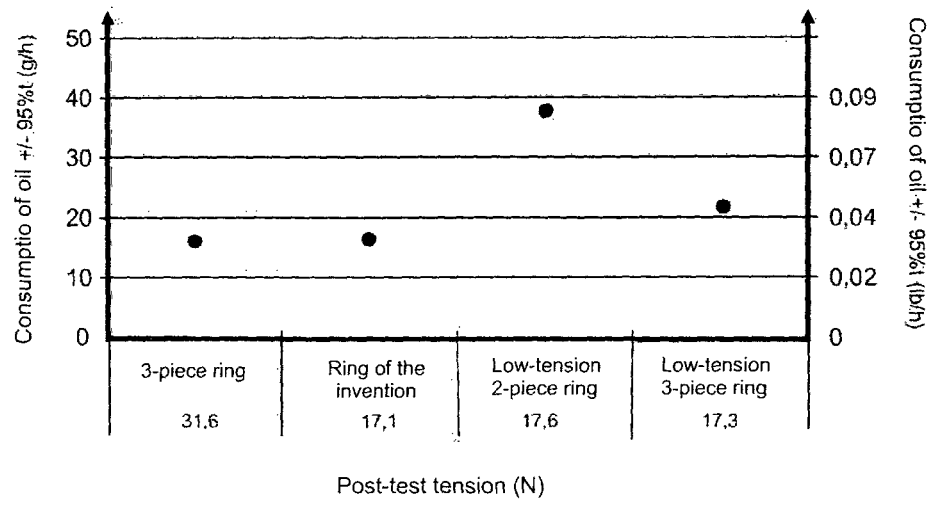
FIG. 5 is a comparative graph of the consumption of oil and of the tangential force (stress) applied by two-piece or three-piece oil scraping rings of the prior art in comparison with the single-piece oil scraping ring of the present invention.

This geometry enables the reduction of the tangential force exerted by the ring 1 by 50%, guaranteeing that at least 95% of the first area A 1 will contact the cylinder wall and, by inference, a considerable functional advantage of the present ring over the presently known products. The graph in FIG. 5 enables a quite clear comparative view of the reduced tangential force applied by the present ring 1, without increasing the consumption of lubricating oil.

Further with regard to the shape of the ring 1, it should be noted that it is composed by a plurality of segments that are operatively associated to each other, each segment having a substantially C-shaped cross-section, wherein two consecutive associated segments define at least one aperture for passage of lubricating oil. The aperture for passage of lubricating oil has at least one straight-shape or rounded edge, or still any other shape that is functional.

With regard to the process of surface-finishing the ring 1, it is important to note some important differences. On known single-piece oil scraping rings, due to their great flexibility, there was a difficulty in making a surface finish analogous to that of the cylinder wall. As a result, a high tangential force was applied in order to guarantee adequate performance in terms of consumption of oil ion the engine run-in state. Further, this high force ended up enabling this run-in period (the accommodation between the cylinder wall and the ring surface) to be as rapid as possible.

On the ring of the present invention, its geometric constitution makes it possible to obtain an adequate surface finish that guarantees said initial contact area of at least 95% with respect to the cylinder wall. Another resulting advantage is the possibility of applying a coating to the first surface 4 of the present ring 1, since there is no great wear due the run-in by virtue of the lower tangential force.

Figure 6:
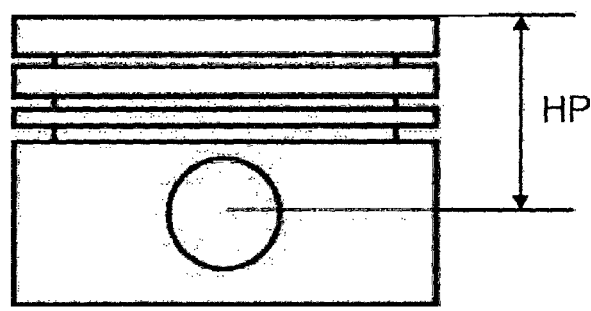
FIG. 6 is a schematic figure of a piston indicating its compression height (KH).

Another advantageous characteristic of the present ring is the possibility of reducing the compression height (HP) of the piston (see FIG. 6), which reduces the axial inertia moment of the piece and, as a result, increases the conformability with respect to the deformations existing on the cylinder.

Preferably, both upper and lower portions 2, 2' exhibit the geometry according to the preceding description, but it is perfectly possible to conceive a ring 1 on which only one of the portions is configured in this way, without it departing from the scope of the accompanying claims. Further, it should be noted that, even though the angle α should be acute and equal to or greater than 30 degrees, more preferably it should exhibit values between 45 and 70 degrees.

When both upper and lower portions 2, 2' have the geometry according to the present invention, both may be oriented in such a way that (i) the two respective second surfaces 5 will face each other, that is, they will be symmetrical, in an assemblage that focus mainly on the reduction of friction of the contact surfaces with respect to the cylinder wall; or, alternatively, (ii) oriented so that the two respective second surfaces 5 will face the same direction, that is, they will be asymmetrical, an assemblage that, besides enabling the reduction of friction during the functioning of the part, enables better oil scraping by the ring on the cylinder wall, bringing about lower consumption of lubricant.

The present ring is preferably stamped on steel, but it is evident that other mechanical conformation processes and materials may be used, if necessary or desirable.

Preferred examples of embodiment having been described, it should be understood that the scope of the present invention embraces other possible variations, being limited only by the contents of the accompanying claims, which include the possible equivalents.

The invention claimed is:

1. A single-piece oil control ring for a piston, comprising:
a body configured to be mounted on a piston groove of the piston and including at least one upper portion and at least one lower portion each having a free end facing towards a cylinder wall of an internal combustion engine;
wherein the free end of at least one of the upper portion and the lower portion respectively defines a first surface extending substantially perpendicular to the body and a receding second surface extending from the first surface substantially at an incline, the first surface protruding towards the cylinder wall in relation to the second surface;
wherein the first surface has a first area of contact with the cylinder wall, and wherein at least 95% of the first area contacts the cylinder wall; and
wherein the second surface defines an acute angle in relation to the first surface, the acute angle being greater than or equal to 30 degrees.

2. The ring according to claim 1, wherein the body is composed of a plurality of segments that are operatively associated to each other, each of the plurality of segments having a substantially C-shaped cross-section, and wherein the at least one upper portion and the at least one lower portion extend in a direction towards the cylinder wall.

3. The ring according to claim 2, wherein two consecutive associated segments of the plurality of segments define at least one aperture for passage of a lubricating oil.

4. The ring according to claim 3, wherein the at least one aperture has at least one of a straight and a rounded edge.

5. The ring according to claim 1, wherein the acute angle is between 45 and 70 degrees.

6. The ring according to claim 1, wherein the first surface of at least one of the upper portion and the lower portion includes an extent of less than or equal to 0.15 millimeters.

7. The ring according to claim 1, wherein the body is stamped on steel.

8. An oil control ring for a piston, comprising:
a single-piece body configured to be mounted on a piston groove of the piston and including an upper portion and a lower portion positioned away from a region of combustion in relation to the upper portion, the upper portion and the lower portion each extending radially with respect to the piston and having a free end facing away from the piston to interact with a cylinder wall receiving the piston;
wherein the free end of the upper portion and the lower portion each include a protruding first surface extending substantially perpendicular to the body, from which a second substantially inclined surface extends and retreats from the cylinder wall in relation to the first surface, the second surface defining an angle in relation to the first surface;
wherein the first surface of at least one of the upper portion and the lower portion includes an extent equal to or lower than 0.15 millimeters; and
wherein the angle of the second surface of the at least one of the upper portion and the lower portion is an acute angle equal to or greater than 30 degrees.

9. The ring according to claim 8, wherein the acute angle of the second surface is between 45 and 70 degrees.

10. The ring according to claim 8, wherein the body is composed of a plurality of segments that are operatively associated to each other, and each of the plurality of segments having a substantially C-shaped cross-section.

11. The ring according to claim 10, wherein at least two consecutive associated segments of the plurality of segments define at least one aperture for passage of a lubricating oil.

12. The ring according to claim 11, wherein the aperture includes at least one of a straight edge and a rounded edge.

13. The ring according to claim 8, wherein the body is stamped on steel.

14. The ring according to claim 8, wherein at least 85% of the extent of the first surface of at least one of the upper portion and the lower portion contacts the cylinder wall.

15. The ring according to claim 8, wherein the first surface of at least one of the upper portion and the lower portion further includes a first area for contacting the cylinder wall, and
wherein at least 95% of the first area contacts the cylinder wall.

16. The ring according to claim 8, wherein the second surface of the upper portion and the lower portion face one of towards each other and away from each other.

17. The ring according to claim 1, wherein the free end of each of the at least one upper portion and the at least one lower portion includes the first surface and the second surface, and
wherein the second surface of the at least one upper portion and the at least one lower portion face one of towards each other and away from each other.

18. The ring according to claim 6, wherein the body defines a geometry having a substantially C-shaped cross-section.

19. The ring according to claim 6, wherein the incline of the second surface defines an acute angle in relation to the first surface, the acute angle ranging from 45 degrees to 70 degrees.

20. The ring according to claim 1, wherein the second surface is disposed on an inner side of the at least one of the upper portion and the lower portion facing towards the other of the upper portion and the lower portion.

\* \* \* \* \*